United States Patent
Ilan et al.

(10) Patent No.: US 11,755,512 B2
(45) Date of Patent: Sep. 12, 2023

(54) MANAGING INTER-PROCESSOR INTERRUPTS IN VIRTUALIZED COMPUTER SYSTEMS

(71) Applicant: RED HAT, INC., Raleigh, NC (US)

(72) Inventors: Amnon Ilan, Raanana (IL); Michael Tsirkin, Haifa (IL)

(73) Assignee: Red Hat, Inc., Raleigh, NC (US)

( * ) Notice: Subject to any disclaimer, the term of this patent is extended or adjusted under 35 U.S.C. 154(b) by 18 days.

(21) Appl. No.: 17/404,947

(22) Filed: Aug. 17, 2021

(65) Prior Publication Data
US 2023/0057562 A1    Feb. 23, 2023

(51) Int. Cl.
*G06F 13/24*    (2006.01)
*G06F 13/42*    (2006.01)
*G06F 9/50*    (2006.01)
*G06F 9/455*    (2018.01)

(52) U.S. Cl.
CPC .......... *G06F 13/24* (2013.01); *G06F 9/45558* (2013.01); *G06F 9/5016* (2013.01); *G06F 13/4221* (2013.01); *G06F 2009/45579* (2013.01); *G06F 2009/45583* (2013.01)

(58) Field of Classification Search
CPC .... G06F 9/45558; G06F 9/5016; G06F 13/24; G06F 13/4221; G06F 2009/45579; G06F 2009/45583
See application file for complete search history.

(56) References Cited

U.S. PATENT DOCUMENTS

| | | |
|---|---|---|
| 8,312,195 B2 | 11/2012 | van Riel |
| 8,706,941 B2 | 4/2014 | Serebrin et al. |
| 9,235,538 B2 | 1/2016 | Tsirkin et al. |
| 9,892,069 B2 | 2/2018 | Madukkarumukumana et al. |
| 10,949,243 B2 | 3/2021 | Tsirkin |
| 2002/0152344 A1* | 10/2002 | Holm .................. G06F 9/45541 710/260 |
| 2011/0197004 A1* | 8/2011 | Serebrin ............. G06F 9/45558 710/267 |
| 2012/0167082 A1* | 6/2012 | Kumar ................ G06F 9/45558 718/1 |

(Continued)

OTHER PUBLICATIONS

Feng Wu et al., "VT-d Posted Interrupts", https://events.static.linuxfound.org/sites/events/files/slides/VT-d%20Posted%20Interrupts-final%20.pdf, Intel Corporation, Aug. 26, 2014, 17 pages.

*Primary Examiner* — Eric T Oberly
(74) *Attorney, Agent, or Firm* — Lowenstein Sandler LLP

(57) ABSTRACT

An example method may include allocating, on a host computer system, a memory page in a memory of an input/output (I/O) device, mapping the memory page into a memory space of a virtual machine associated with a first virtual processor, creating a first entry in an interrupt mapping table in the memory of the I/O device, where the first entry includes a memory address that is associated with a second virtual processor identifier and further includes an interrupt vector identifier; and creating a second entry in an interrupt injection table of an interrupt injection unit of the host computer system, where the second entry is associated with a memory address that corresponds to a second virtual processor, the second entry includes the interrupt vector identifier, and the second entry is further associated with the second virtual processor identifier.

20 Claims, 6 Drawing Sheets

(56) References Cited

U.S. PATENT DOCUMENTS

| | | | |
|---|---|---|---|
| 2012/0271981 A1* | 10/2012 | Bayer | G06F 12/1081 |
| | | | 711/6 |
| 2016/0342543 A1* | 11/2016 | Bonzini | G06F 9/4812 |
| 2019/0370049 A1 | 12/2019 | Gopalan | |
| 2020/0125397 A1 | 4/2020 | Wu et al. | |
| 2020/0133878 A1* | 4/2020 | Asaro | G06F 12/1081 |

* cited by examiner

MANAGING INTER-PROCESSOR INTERRUPTS IN VIRTUALIZED COMPUTER SYSTEMS

TECHNICAL FIELD

The present disclosure is generally related to virtualized computer systems, and is more specifically related to systems and methods for managing inter-processor interrupts in virtualized computer systems.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

One design aspect in a virtualized computer system is routing and processing of interrupts. "Interrupt" herein shall refer to an event that requires a processor to execute event-specific instructions, which might involve the processor's holding the current thread of execution and/or switching contexts.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
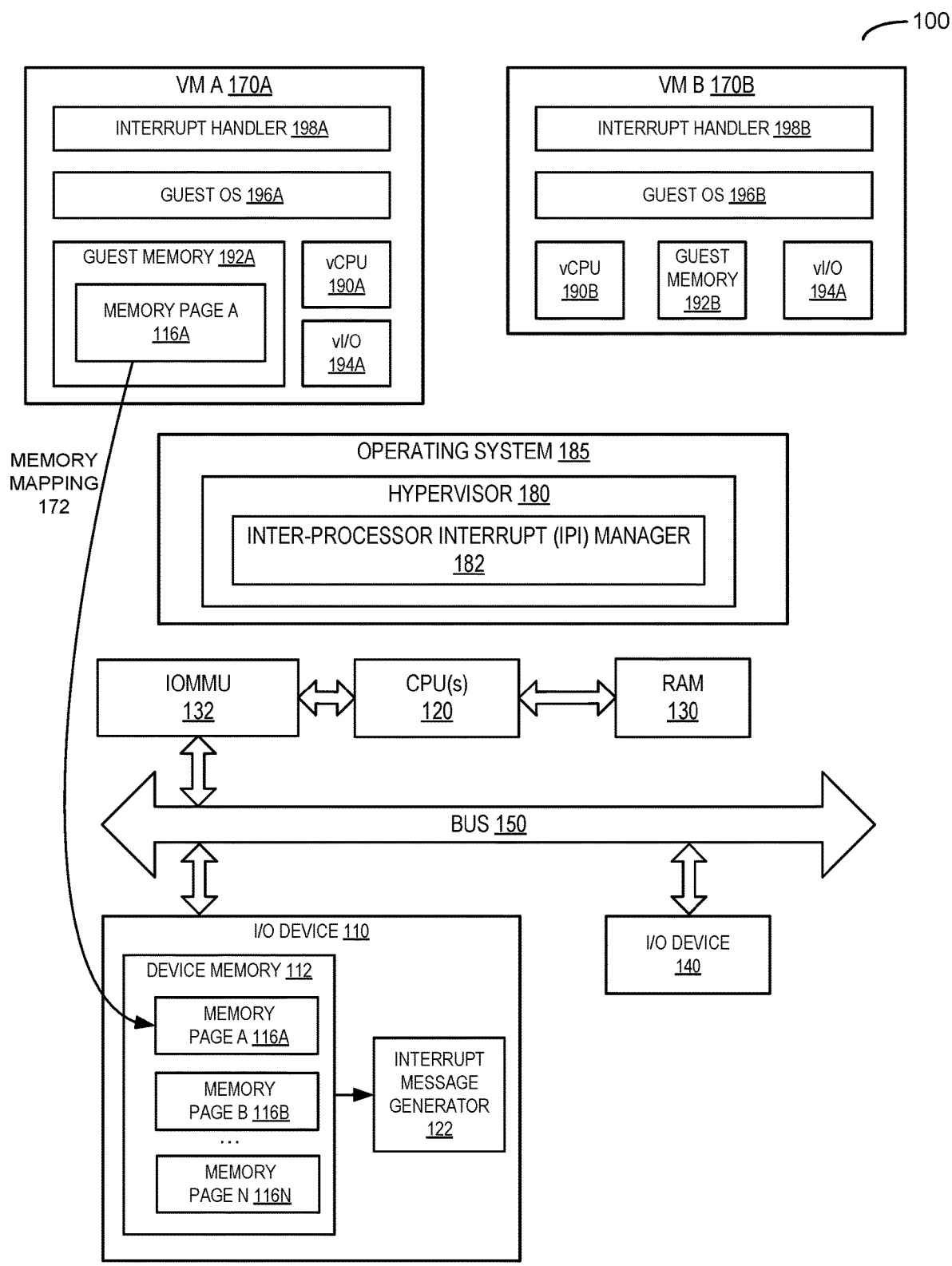
FIG. 1 depicts a high-level component diagram of an example multi-processor computer system implementing inter-processor interrupts, in accordance with one or more aspects of the present disclosure.

Described herein are systems and methods for managing inter-processor interrupts in virtualized computer systems.

In a multi-processor computer system, interrupts may be processed by one or more interrupt controllers such as Advanced Programmable Interrupt Controllers (APICs), including one local APIC per processor and one or more input/output (I/O) APICs connected to I/O devices. Various computer systems may employ out-of-band and/or in-band interrupt signaling mechanisms. Out-of-band interrupt signaling involves asserting, by a peripheral device, a certain line of a control bus (referred to as an interrupt line) in order to signal an interrupt to the processor. Conversely, in-band interrupt signaling, also referred to as message signaled interrupts (MSI), involves transmitting, by a peripheral device, a message through the main data path (e.g., through a Peripheral Component Interconnect (PCI) bus).

The MSI mechanism allows a peripheral device to write certain data to a memory address. In one example, the memory address is mapped to a control register of an interrupt controller so that each combination of the address and data defines an interrupt vector and a destination of the interrupt. In an illustrative example, the address specifies one or more processors that will receive the interrupt. The interrupt controller processes the data to determine which interrupt to trigger on which processor and delivers the interrupt to the processor.

The MSI specification (as defined in PCI 2.2 Specification by Peripheral Component Interconnect Special Interest Group (PCI-SIG)) permits a peripheral device to allocate 1, 2, 4, 8, 16, or 32 interrupt vectors. The peripheral device may be configured with a memory address (e.g., the control register address of an interrupt controller), and a 16-bit device identifier. The peripheral device may write, to the specified address, an interrupt identifier produced by combining the interrupt vector number and the device identifier.

The MSI-X specification (as defined in PCI 3.0 Specification by PCI-SIG) allows a larger number of interrupts (up to 2048) and assigns, to each interrupt, a separate control register address and data word acting as the device identifier and interrupt vector identifier. The device driver may configure the physical device with an interrupt mapping table (also referred to as MSI-X table) comprising a plurality of interrupt mapping entries, such that each interrupt mapping entry comprises a message address (e.g., the control register address), message data (e.g., the interrupt vector identifier), and a vector control flag (to enable/disable sending MSI-X messages to the specified message address).

An inter-processor interrupt (WI) may be sent between virtual processors in a virtualized computer system. Each of the virtual processors may be associated with a different virtual machine, and the virtual machines may be managed by a hypervisor. A sending virtual machine may specify an interrupt vector identifier and a destination virtual processor, and invoke an operation that causes the sending virtual processor to send the interrupt. A host computer system may then cause an interrupt to occur in the destination virtual processor. For example, the host computer system may cause the destination virtual processor to perform interrupt handler instructions, and may provide the interrupt vector identifier to the interrupt handler instructions.

In existing implementations, the sending virtual machine performs a VM exit operation so that the hypervisor can identify the destination virtual processor and perform operations that send the interrupt to the destination virtual processor. However, the VM exit operation that switches from the sending VM to the hypervisor has a substantial performance overhead, which reduces overall system performance. Further, the VM exit operation increases the delay between sending the interrupt from the sending virtual processor and receiving the interrupt at the destination virtual processor.

Aspects of the present disclosure address the above-noted and other deficiencies by providing technology that enables sending of inter-processor interrupts (IPIs) between virtual processors. An IPI manager component configures components of a host computer system so that a source virtual processor can send inter-processor interrupts (IPIs) to a destination virtual processor by writing interrupt data representing the inter-processor interrupt to memory of an I/O device of the host computer system. The interrupt data can include a destination virtual processor identifier and an interrupt vector identifier.

The I/O device may include an interrupt message generator component that detects a write of interrupt data to the I/O device memory and generates, on an I/O bus of the host computer system, a message-signaled interrupt having a destination virtual processor identifier and interrupt vector identifier specified by the interrupt data. The interrupt message generator can generate the interrupt message using information specified in an interrupt mapping table, which can be created by the interrupt message generator or by the IPI manager, for example. The interrupt mapping table may have an entry that includes or is generated from the destination virtual processor identifier and interrupt vector identifier. The interrupt message generator can generate a message-signaled interrupt in response to a write of interrupt data to the I/O device memory by a source virtual processor. To generate the message-signaled interrupt, the interrupt message generator finds the interrupt mapping table entry that corresponds to the destination virtual processor identifier and interrupt vector identifier, and writes data specified in the entry to a memory address specified in the entry. The generated message-signaled interrupt has the interrupt vector identifier and destination processor identifier specified in the interrupt data.

The IPI manager can configure an interrupt injection unit, such as an I/O memory management unit (IOMMU) of the host computer system, to translate the message-signaled interrupt to a posted interrupt and inject the posted interrupt into the destination virtual processor specified by the message-signaled interrupt. The posted interrupt may include the interrupt vector identifier specified in the message-signaled interrupt. The destination virtual processor may perform an action in response to the posted interrupt, such as invoking an interrupt service handler.

Advantages of the present disclosure include, but are not limited to, reduction in the amount of performance overhead (e.g., additional processing time) added by the virtualization system to operations that send inter-processor interrupts between virtualized processors. A virtual machine can use the techniques of the present disclosure to send an inter-processor interrupt to a destination virtual processor by writing the interrupt data to memory without performing a VM exit to the hypervisor. Existing techniques for sending inter-processor interrupts to a destination virtual processor perform a VM exit from the sending virtual machine to the hypervisor because the identity of the host logical CPU (e.g., physical CPU or CPU core) associated with the destination virtual processor is not known to the sending virtual machine. Existing techniques thus perform the VM exit to the hypervisor, which emulates a programmable interrupt controller for (PIC) the destination virtual processor, and can use the emulated (PIC) to send the WI to the destination virtual processor.

A VM exit to the hypervisor has substantial performance overhead, which reduces overall system performance. Further, the VM exit operation increases the delay between sending the WI from the sending virtual processor and receiving the IPI at the destination virtual processor. Since the disclosed techniques need not use the hypervisor in operations that send IPIs, the hypervisor overhead, including the VM exit overhead, is not incurred. The disclosed techniques can thus have greater overall system performance and lower IPI latency than existing techniques that use the hypervisor to send IPIs.

Various aspects of the above referenced methods and systems are described in details herein below by way of examples, rather than by way of limitation. The examples provided below discuss managing IPIs sent between virtual processors. In other examples, IPIs may be sent in a non-virtualized computer system that is absent a hypervisor or other virtualization features discussed below.

FIG. 1 depicts a high-level component diagram of an example multi-processor computer system 100 implementing inter-processor interrupts, in accordance with one or more aspects of the present disclosure. The computer system 100 may include one or more processors 120 communicatively coupled to memory devices 130 and input/output (I/O) devices 110, 140 via a system bus 150. The computer system 100 may include one or more interconnected nodes (not shown). Each node may in turn include one or more physical processors 120 communicatively coupled to memory devices 130 and input/output (I/O) devices 110, 140.

"Processor" or "physical processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and a second device. The second device may be, for example, an external device capable of inputting and/or outputting binary data.

Processors 120 may be interconnected using a variety of techniques, ranging from a point-to-point processor interconnect, to a system area network, such as an InfiniBand-based network. Local connections within each node, including the connections between a processor 120 and a memory 130 and between a processor 120 and an I/O device 140 may be provided by one or more local buses 150 of suitable architecture, for example, PCI.

Computer system 100 may run one or more virtual machines 170A-170B, by executing a software layer 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170A-170B as virtual devices. A virtual machine 170 may execute a guest operating system 196 which may utilize underlying virtual processors (also referred to as virtual central processing units (vCPUs)) 190, guest memory 192, and virtual I/O devices 194. One or more interrupt handlers 198A-198B and/or applications may be running on a virtual machine 170 under a guest operating system 196.

In various illustrative examples, processor virtualization may be implemented by the hypervisor scheduling time slots on one or more physical processors for a virtual machine, rather than a virtual machine actually having a dedicated physical processor. Device virtualization may be implemented by intercepting virtual machine memory read/write and/or input/output (I/O) operations with respect to certain memory and/or I/O port ranges, and by routing hardware interrupts to a virtual machine associated with the corresponding virtual device. Memory virtualization may be implementing by a paging mechanism allocating the host RAM to virtual machine memory pages and swapping the memory pages to a backing storage when necessary. Computer system 100 may support a virtual memory environment in which a virtual machine address space is simulated with a smaller amount of the host random access memory (RAM) and a backing storage (e.g., a file on a disk or a raw storage device), thus allowing the host to over-commit the memory. The virtual machine memory space may be divided into memory pages which may be allocated in the host RAM and swapped to the backing storage when necessary. The guest operating system may maintain a page directory and a set of page tables to keep track of the memory pages. When a virtual machine attempts to access a memory page, it may use the page directory and page tables to translate the virtual address into a physical address. If the page being accessed is not currently in the host RAM, a page-fault exception may be generated, responsive to which the host computer system may read the page from the backing storage and continue executing the virtual machine that caused the exception.

An IOMMU 132 is a memory management unit (MMU) that resides on the input/output (I/O) path connecting a device to the memory and manages address translations. The IOMMU brokers an incoming DMA request on behalf of an I/O device 110 or 140 by translating a virtual address referenced by the I/O device to a physical address similarly to the translation process performed by the MMU of a processor 120. The IOMMU 132 also includes a posted-interrupt processing feature that can map each incoming memory write request to an interrupt, referred to herein as a posted interrupt. The IOMMU 132 can also inject the posted interrupt into a virtual processor. Thus, the IOMMU 132 is referred to herein as an interrupt injection unit.

The IOMMU 132 processes each incoming write request that specifies a memory address in a defined range. The incoming write request can be, for example, a message-signaled interrupt (MSI). The IOMMU 132 maps the incoming memory write request to the interrupt according to an interrupt injection table in the IOMMU 132. The interrupt injection table can be created and modified by instructions executed by the CPU 120. For example, an IPI manager component 182 can create entries in the interrupt injection table that translate each incoming MSI to a posted interrupt having the same interrupt vector identifier as the incoming MSI, and cause the IOMMU 132 to inject the posted interrupt into the virtual processor 190 that corresponds to the memory address specified by the incoming MSI.

The interrupt injection table in the IOMMU 132 includes one or more entries, which the IPI manager component 182 can create. Each entry in the interrupt injection table may be associated with memory address that corresponds to the destination virtual processor 190B into which the posted interrupt is to be injected, and may include a first interrupt vector identifier. Each entry may further be associated with a destination virtual processor identifier that corresponds to the destination virtual processor, and may also be associated with a second interrupt vector number for the interrupt to be injected into the destination virtual processor. The first and second interrupt vector numbers are ordinarily the same, so that the interrupt vector number does not change between sending and delivery of the IPI. The IOMMU 132 may translate each message-signaled interrupt that matches an entry of the interrupt injection table (e.g., is sent to a memory address specified in an interrupt injection table entry and has the same interrupt vector identifier as the table entry) to a posted interrupt in the virtual processor 190 specified by the matching entry's virtual processor identifier and having the interrupt vector identifier specified by the matching entry. The IPI manager component 182 may generate an interrupt injection table entry for each combination of destination virtual processor identifier and interrupt vector that is expected (or permitted) to be used by a source virtual processor to send an inter-processor interrupt. Although posted-interrupt processing is described herein as being performed by the IOMMU 132, posted-interrupt processing may be performed by other components, e.g., by processor 120 or other suitable component of the computer system 100.

I/O device 110 includes device memory 112 and an interrupt message generator 122. Device memory 112 includes one or more memory pages 116. Device memory 112 may be accessible via bus 150. I/O device 110 may be a PCI card that includes an interrupt message generator 122. I/O device 110 may perform other operations not shown. Interrupt message generator 112 may generate MSI interrupts in accordance with data in memory pages 116. For example, interrupt message generator 112 may request notification of each write operation performed on device memory 112. Interrupt message generator 112 may then generate an MSI interrupt in response to each write operation in accordance with the data written to a memory page 116 by the write operation.

IPI manager component 182 running on host computer system 100 may perform various IPI-related functions in accordance with one or more aspects of the present disclosure. In certain implementations, IPI manager component 182 may be implemented as a software component invoked by hypervisor 180. Alternatively, functions of IPI manager component 182 may be performed by hypervisor 180.

IPI manager component 182 may map a page of the I/O device's memory into an address space of a virtual machine associated with the source virtual processor so that the source virtual processor can write the interrupt data to the page of the I/O device memory. For example, IPI manager component 182 may perform memory-mapping operations that map each memory page 116 of I/O device 110 into an address space of a corresponding VM 170. WI manager component 182 may establish a memory mapping 172 that maps memory page A 116A into an address space of VM 170A shown as guest memory 192A. Memory mapping 172 enables VM A 170A to write data to memory page A 116A of I/O device 110. Memory mapping 172 may be implemented by the IOMMU 132, for example. Further, IPI manager 182 may create an interrupt mapping table in I/O device 110 that is used (e.g., by interrupt message generator 122) to generate MSI interrupts in accordance with data written to device memory 112 by VMs 170. IPI manager 182 may create a mapping table in IOMMU 132, referred to herein as an "interrupt injection table," that is used by IOMMU 132 to translate MSI interrupts to posted interrupts and inject each posted interrupt into a corresponding virtual processor 190.

Figure 2:
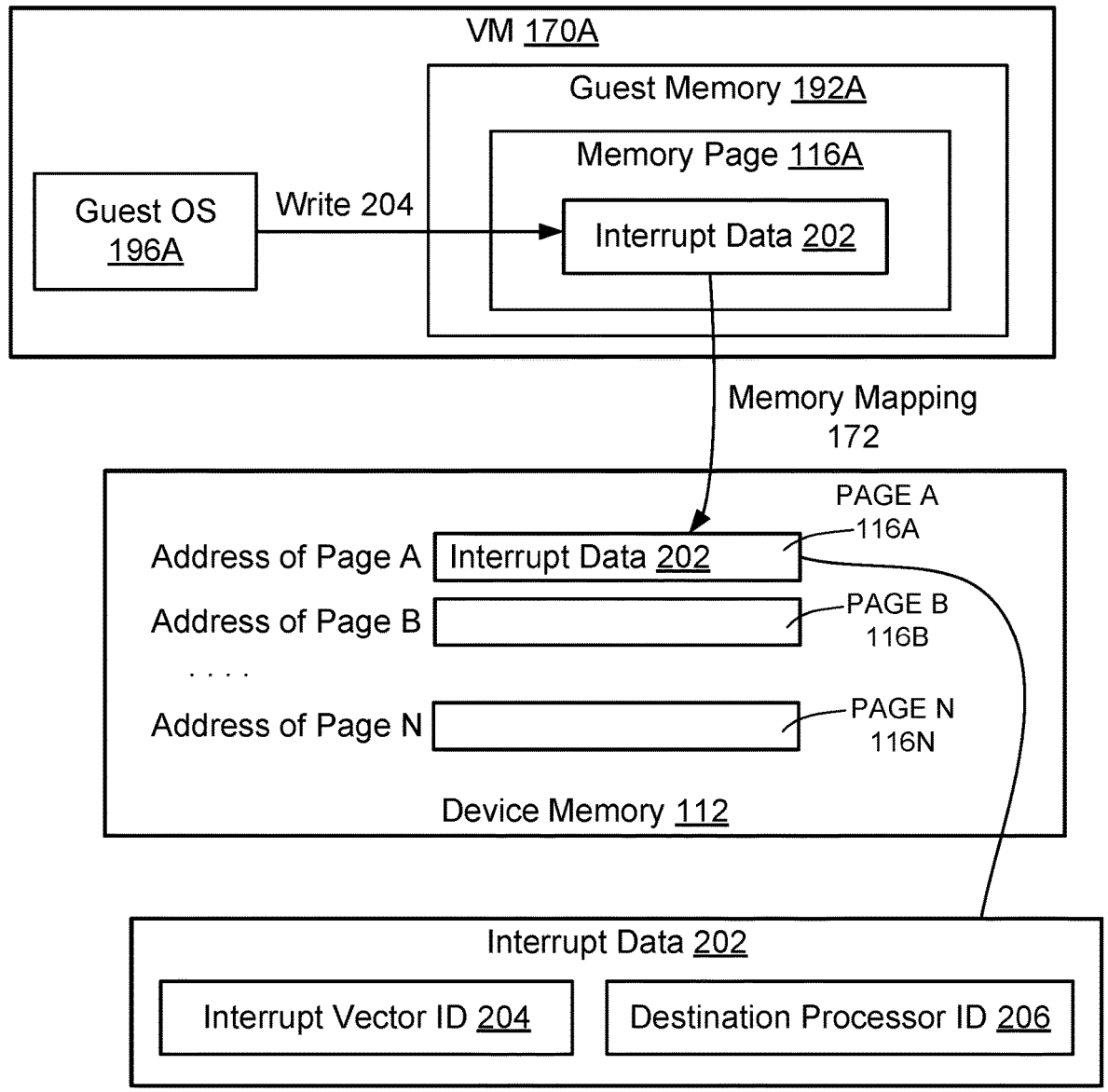
FIG. 2 depicts a block diagram illustrating example memory pages in which interrupt data is stored by a virtual machine, in accordance with one or more aspects of the present disclosure.

FIG. 2 depicts a block diagram illustrating example memory pages 116 in which interrupt data 202 is stored by a virtual machine 170, in accordance with one or more aspects of the present disclosure. As described above with respect to FIG. 1, the memory mapping 172 maps page A 116A of device memory 112 into guest memory 192. A write operation 204 performed by guest operating system 196A in VM 170A stores interrupt data 202 in memory page 116A via the memory mapping 172. Interrupt data 202 may include an interrupt vector ID 204 and a destination CPU ID 206, each of which may be specified by the write operation 204 performed by the VM 170A.

The interrupt message generator 122 generates an MSI in response to the interrupt data being written to the memory page 116. For example, if VM 170A writes interrupt data 202 to page A 116A, the interrupt message generator 122 generates an MSI in response to the interrupt data being written to page A 116A. The generated MSI's attributes, such as a destination virtual processor and an interrupt vector identifier, may be determined from corresponding attributes of the interrupt data 202.

Although not shown, each VM 170 may write interrupt data into a memory page 116 that is mapped into the guest memory 192 of the VM 170, and the interrupt message generator 122 generates an MSI in response to the interrupt data being written to the memory page 116. For example, VM 170B can write interrupt data to page B 116B, and the interrupt message generator 122 generates an MSI in response to the interrupt data being written to page B 116B.

Figure 3:
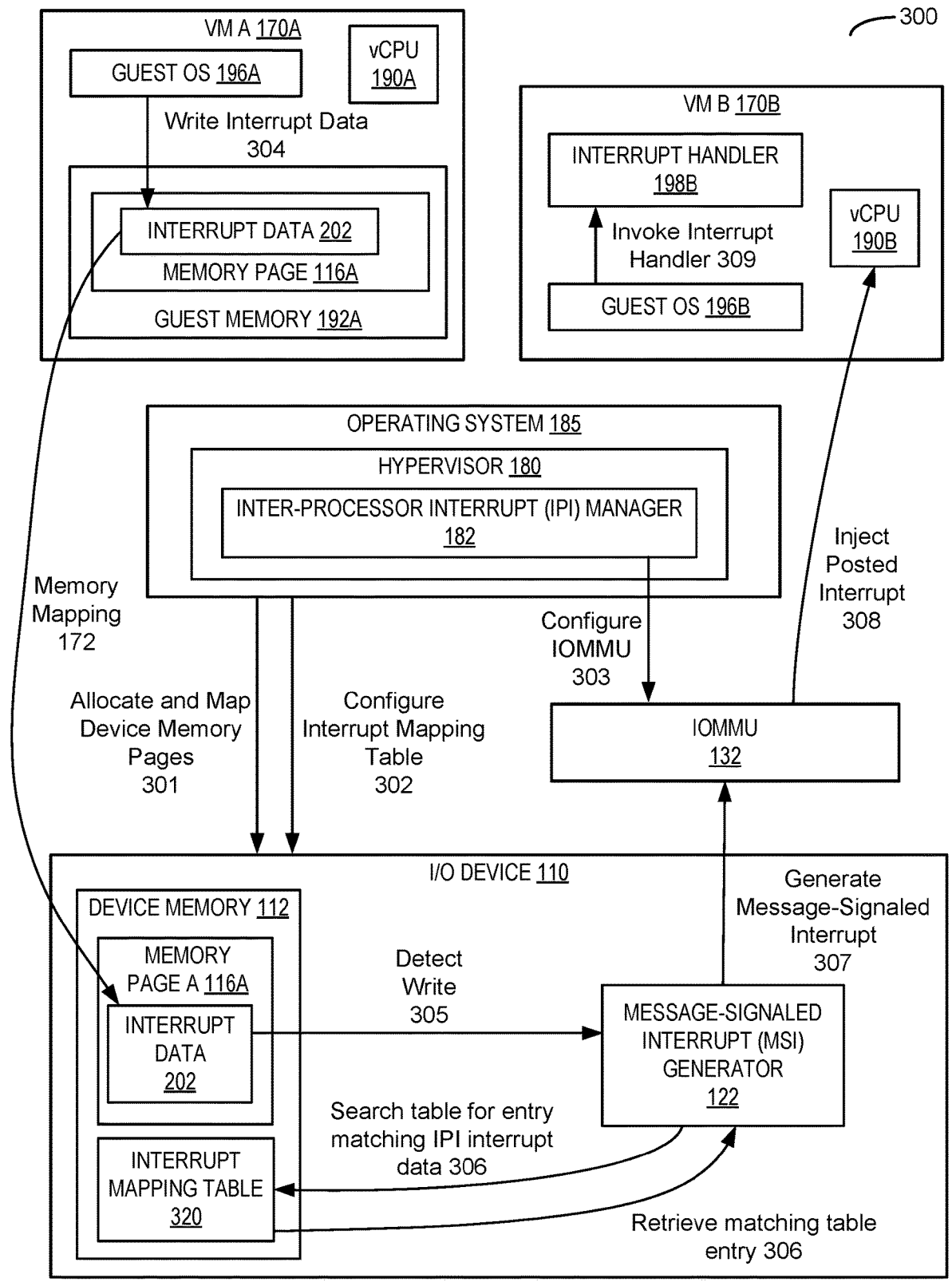
FIG. 3 depicts a block diagram illustrating example interactions involves in sending an inter-processor interrupt from a first virtual processor to a second virtual processor, in accordance with one or more aspects of the present disclosure.

FIG. 3 depicts a block diagram illustrating example interactions involves in sending an inter-processor interrupt from a source virtual processor 190A to a destination virtual processor 190B, in accordance with one or more aspects of the present disclosure. The IPI manager 182 may perform operations 301-303 during an initialization phase prior to execution of virtual processors 190, for example. At operation 301, an WI manager 182 may allocate and maps device memory pages into guest memory 192. At operation 302, the WI manager 182 may configure I/O device 110 to generate MSI's by creating an interrupt mapping table 320 of I/O device 110. The interrupt mapping table 320 may include one or more entries. Each interrupt mapping table entry may include a message address, which contains or is derived from a destination virtual processor identifier, and an interrupt vector. The IPI manager 182 may generate an entry for each combination of destination virtual processor identifier and interrupt vector that is expected (or permitted) to be used by a source virtual processor to send an inter-processor interrupt. Alternatively or additionally, the entries in the interrupt mapping table may be generated by the interrupt message generator 122 or other component, e.g., during the initialization phase described above.

The interrupt mapping table 320 is subsequently used by an MSI generator 122 to generate MSI's from interrupt data 202 written to device memory pages 116 by source virtual processor 190A. At operation 303, the WI manager 182 may configure an IOMMU 132 to generate posted interrupts at the destination virtual processor 190B. The IOMMU 132 may generate each posted interrupt in response to receiving a corresponding MSI. For example, the IOMMU 132 may translate each MSI to a posted interrupt that is injected into the destination virtual processor 190B.

At operation 304, the source virtual processor 190A may send an WI to the destination virtual processor 190B by writing interrupt data 202 to a memory page 116A mapped into guest memory 192A. The interrupt data 202 may specify an interrupt vector identifier 204 (e.g., an interrupt vector number from a range of valid interrupt vector numbers) and a destination virtual processor identifier 206 (e.g., a virtual processor number from a range of valid virtual processor numbers).

At operation 306, the MSI generator 122 on I/O device 122 may detect that the interrupt data 202 has been written to memory page A 116A. In response to detecting the write, at operation 306 the MSI generator 122 may search an interrupt mapping table 320 for an entry matching the IPI interrupt data 202. At operation 306, the MSI generator 122 may retrieve a matching table entry, e.g., a table entry that includes the interrupt vector identifier 204 and destination virtual processor identifier 206 specified in the interrupt data 202. At operation 307, the MSI generator 122 may generate an MSI using the matching table entry. The generated MSI includes the interrupt vector identifier 204 the destination virtual processor identifier 206. Operation 307 causes the MSI to be sent to the IOM MU 132, e.g., via bus 150.

At operation 308, the IOM MU 132 translates the MSI to a posted interrupt and injects the posted interrupt into the destination virtual processor 190B. At operation 309, the guest operating system 192B invokes an interrupt handler 198B in response to the posted interrupt in virtual processor 190B. The guest operating system 192B may provide the interrupt vector identifier associated with the posted interrupt to the interrupt handler 198B. The interrupt handler 198B may be program code in an application or in the guest operating system 196B, and may perform actions such as scheduling a particular thread for execution or stopping the virtual machine 170B associated with the destination virtual processor 190B so that the, for example, the state of virtual machine 170B can be checkpointed or migrated, or virtual machine 170 can be shut down.

Operation 308 may determine whether the destination virtual processor 190B is running, e.g., by evaluating a scheduling state of the virtual processor 190B. The scheduling state may be provided by the virtual machine 170B or the guest operating system 196B, for example. If operation 308 determines that the virtual processor 170B is running, then operation 308 may generate, e.g., using the interrupt injection unit, a posted interrupt at a logical processor that corresponds to the virtual processor 190B. The posted interrupt may include the interrupt vector identifier. The logical processor may be, for example, a physical core of a physical processor associated with the virtual processor 190B.

If operation 308 determines that the destination virtual processor 190B is not running, then operation 308 may generate, e.g., using the interrupt injection unit, a host interrupt in the host computer system. The hypervisor 180 may detect the host interrupt, for example. The host interrupt may include the interrupt vector identifier. The host interrupt may be associated with the second virtual processor identifier, and the hypervisor 180 may store the interrupt vector identifier and destination virtual processor identifier 206. The hypervisor 180 may subsequently inject or otherwise cause an interrupt at the destination virtual processor 190B in accordance with the stored interrupt vector and destination virtual processor identifier 206 in response to detecting that the destination virtual processor 190B is running.

Figure 4:
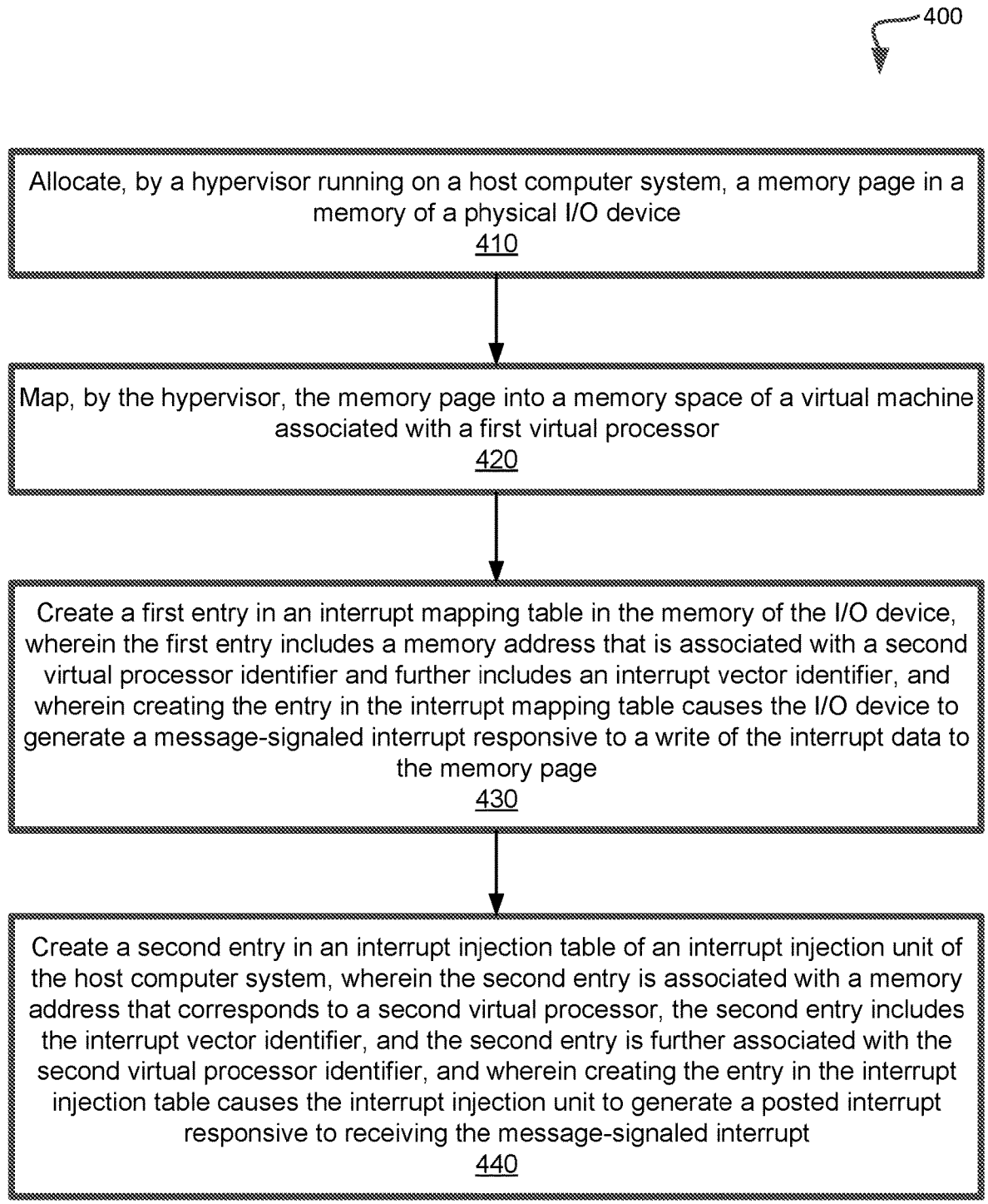
FIG. 4 depicts a flow diagram of an example method for configuring components of a host computer system to send inter-processor interrupts between virtual processors, in accordance with one or more aspects of the present disclosure.

FIG. 4 depicts a flow diagram of an example method for configuring components of a host computer system to send inter-processor interrupts between virtual processors, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may begin at block 410. At block 410, a host computer system may allocate, by a hypervisor running on the host computer system, a memory page in a memory of a physical I/O device. At block 420, the host computer system may map, by the hypervisor, the memory page into a memory space of a virtual machine associated with a first virtual processor.

At block 430, the host computer system may create a first entry in an interrupt mapping table in the memory of the I/O device, wherein the first entry includes a memory address that is associated with a second virtual processor identifier and further includes an interrupt vector identifier. Creating the entry in the interrupt mapping table may cause the I/O device to generate a message-signaled interrupt. The I/O device to generate a message-signaled interrupt may be generated by the I/O device responsive to a write of the interrupt data to the memory page, for example.

At block 440, the host computer system may create a second entry in an interrupt injection table of an interrupt injection unit of the host computer system, wherein the second entry is associated with a memory address that corresponds to a second virtual processor, the second entry includes the interrupt vector identifier, and the second entry is further associated with the second virtual processor identifier. Creating the entry in the interrupt injection table may cause the interrupt injection unit to generate a posted interrupt. The interrupt injection unit may generate the posted interrupt responsive to receiving the message-signaled interrupt, for example. The I/O device may communicate with the interrupt injection unit via a peripheral interface bus such as a PCI bus. The I/O device may be a Peripheral Component Interconnect (PCI) card, for example. Responsive to completing the operations described herein above with references to block 440, the method may terminate.

Figure 5:
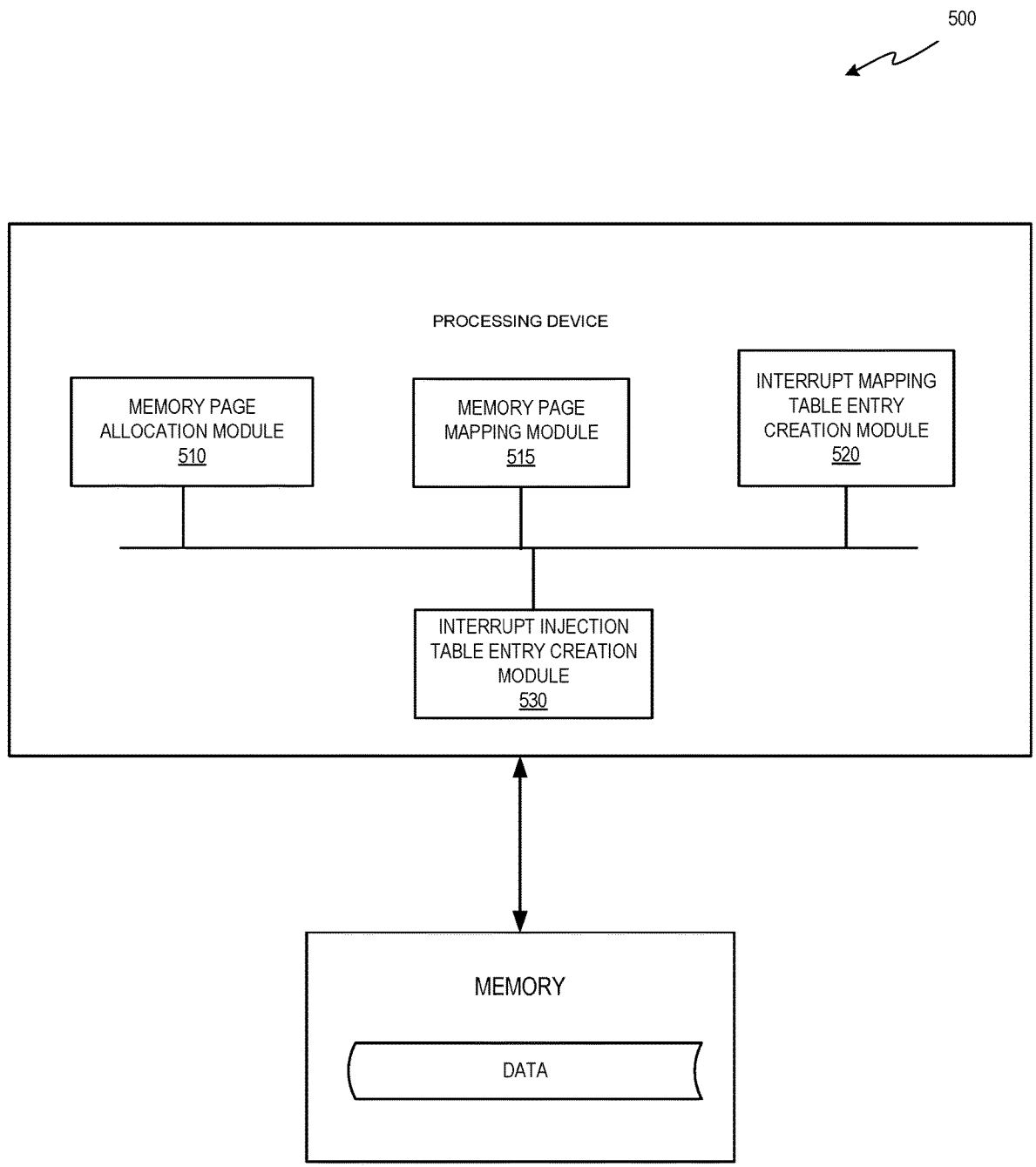
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computer system 100 of FIG. 1, and may include one or more processors and one or more memory devices. In the example shown, computer system 500 may include a memory page allocation module 510, a memory page mapping module 515, an interrupt mapping table entry creation module 520, and an interrupt injection table entry creation module 530.

Memory page allocation module 510 may enable a processor to allocate, by a hypervisor running on a host computer system, a memory page in a memory of an input/output (I/O) device. In one example, the I/O device may be a Peripheral Component Interconnect (PCI) card. Memory page mapping module 515 may enable the processor to map, by the hypervisor, the memory page into a memory space of a virtual machine associated with a first virtual processor. Interrupt mapping table entry creation module 520 may enable the processor to create a first entry in an interrupt mapping table in the memory of the I/O device, where the first entry includes a memory address that is associated with a second virtual processor identifier and further includes an interrupt vector identifier. In one example, the interrupt mapping table may be a Message-Signaled Interrupt (MSI) table, and the interrupt injection unit may be an Input-Output Memory Management Unit (IOMMU).

Interrupt injection table entry creation module 530 may cause the processor to create a second entry in an interrupt injection table of an interrupt injection unit of the host computer system, wherein the second entry is associated with a memory address that corresponds to a second virtual processor, the second entry includes the interrupt vector identifier, and the second entry is further associated with the second virtual processor identifier.

Figure 6:
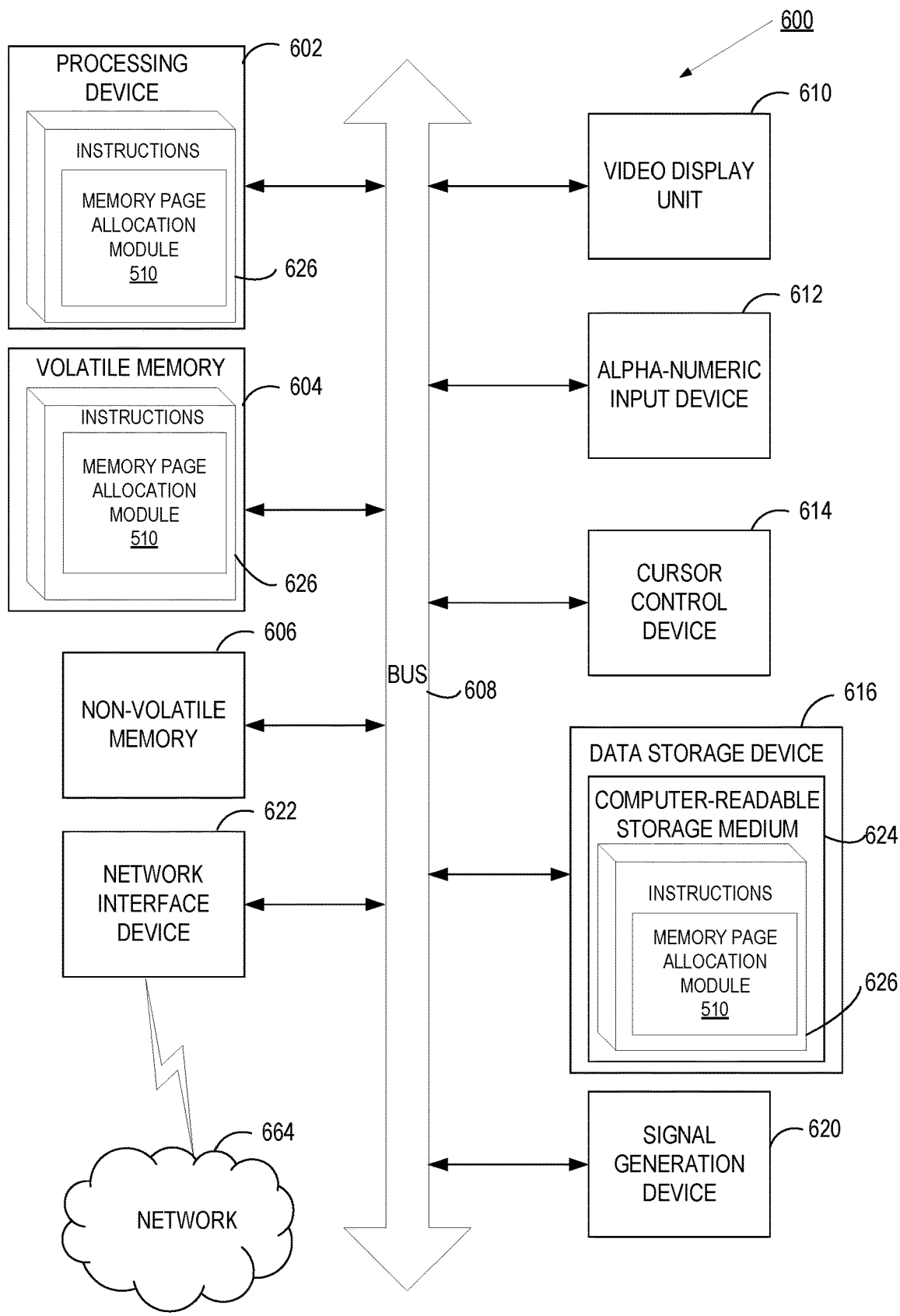
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computer system 100 of FIG. 1. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
allocating, by a hypervisor running on a host computer system, a memory page in a memory of an input/output (I/O) device;
mapping, by the hypervisor, the memory page into a memory space of a virtual machine associated with a first virtual processor;
creating a first entry in an interrupt mapping table in the memory of the I/O device, wherein the first entry includes a memory address that is associated with a second virtual processor identifier and further includes an interrupt vector identifier; and
creating a second entry in an interrupt injection table of the host computer system, wherein the second entry is associated with a memory address that corresponds to a second virtual processor, the second entry includes the interrupt vector identifier, and the second entry is further associated with the second virtual processor identifier;
identifying the interrupt vector identifier and the second virtual processor identifier included in a message-signaled interrupt, and
responsive to determining that the second virtual processor identified by the second virtual processor identifier is running, generating a posted interrupt at a logical processor that corresponds to the second virtual processor identifier, wherein the posted interrupt comprises the interrupt vector identifier.

2. The method of claim 1, wherein the interrupt injection table is an interrupt injection unit, and wherein the I/O device communicates with the interrupt injection unit via a peripheral interface bus.

3. The method of claim 1, wherein the I/O device comprises a Peripheral Component Interconnect (PCI) card.

4. The method of claim 1, wherein creating the first entry in the interrupt mapping table in the memory of the I/O device causes the I/O device to, responsive to a write of interrupt data to the memory page, generate the message-signaled interrupt.

5. The method of claim 4, wherein the interrupt mapping table comprises a Message-Signaled Interrupt (MSI) table, wherein the interrupt injection table is in an interrupt injection unit, and the interrupt injection unit comprises an Input-Output Memory Management Unit (IOMMU).

6. The method of claim 4, wherein the interrupt injection table is in an interrupt injection unit, and wherein creating the second entry in the interrupt injection table causes the interrupt injection unit to, responsive to receiving the message-signaled interrupt, generate the posted interrupt.

7. The method of claim 1, further comprising:
receiving, by the virtual machine associated with the first virtual processor, a request to send an inter-processor interrupt (IPI) to the second virtual processor, wherein the IPI comprises the interrupt vector identifier, and the second virtual processor corresponds to the second virtual processor identifier; and
storing the interrupt vector identifier and the second virtual processor identifier in the memory space of the virtual machine that is mapped to the memory page of the I/O device.

8. The method of claim 7, further comprising:
detecting, by the I/O device, the interrupt vector identifier and the second virtual processor identifier stored in the memory page;
identifying, by the I/O device, an entry in the interrupt mapping table, wherein the identified entry comprises the interrupt vector identifier and the second virtual processor identifier; and
sending, by the I/O device, the message-signaled interrupt in view of the identified entry in the interrupt mapping table, wherein the message-signaled interrupt includes the interrupt vector identifier and the second virtual processor identifier.

9. The method of claim 1, further comprising:
receiving, by an interrupt injection unit, the message-signaled interrupt.

10. The method of claim 9, further comprising:
responsive to determining that the second virtual processor identified by the second virtual processor identifier is not running, generating, by the interrupt injection unit, a host interrupt in the host computer system, wherein the host interrupt comprises the interrupt vector identifier and is associated with the second virtual processor identifier.

11. The method of claim 10, further comprising:
responsive to determining, subsequent to generating the host interrupt, that the second virtual processor is running, generating, by the interrupt injection unit, the posted interrupt at the logical processor that corresponds to the second virtual processor identifier.

12. The method of claim 9, further comprising:
invoking, by the logical processor that corresponds to the second virtual processor identifier, an interrupt handler, wherein the interrupt vector identifier is provided to the interrupt handler.

13. A system comprising:
a memory; and
a processing device communicably coupled to the memory, the processing device to:
allocate, by a hypervisor running on a host computer system, a memory page in a memory of an input/output (I/O) device;
map, by the hypervisor, the memory page into a memory space of a virtual machine associated with a first virtual processor;
create a first entry in an interrupt mapping table in the memory of the I/O device, wherein the first entry includes a memory address that is associated with a second virtual processor identifier and further includes an interrupt vector identifier; and
create a second entry in an interrupt injection table of the host computer system, wherein the second entry is associated with a memory address that corresponds to a second virtual processor, the second entry includes the interrupt vector identifier, and the second entry is further associated with the second virtual processor identifier;
identify the interrupt vector identifier and the second virtual processor identifier included in a message-signaled interrupt; and
responsive to determining that the second virtual processor identified by the second virtual processor identifier is running, generate a posted interrupt at a logical processor that corresponds to the second virtual processor identifier, wherein the posted interrupt comprises the interrupt vector identifier.

14. The system of claim 13, wherein the interrupt injection table is in an interrupt injection unit, and wherein the I/O device communicates with the interrupt injection unit via a peripheral interface bus.

15. The system of claim 13, wherein the I/O device comprises a Peripheral Component Interconnect (PCI) card.

16. The system of claim 13, wherein creating the first entry in the interrupt mapping table in the memory of the I/O device causes the I/O device to, responsive to a write of interrupt data to the memory page, generate the message-signaled interrupt.

17. A non-transitory machine-readable storage medium storing instructions that cause a processing device to:
- allocate, by a hypervisor running on a host computer system, a memory page in a memory of an input/output (I/O) device;
- map, by the hypervisor, the memory page into a memory space of a virtual machine associated with a first virtual processor;
- create a first entry in an interrupt mapping table in the memory of the I/O device, wherein the first entry includes a memory address that is associated with a second virtual processor identifier and further includes an interrupt vector identifier; and
- create a second entry in an interrupt injection table of the host computer system, wherein the second entry is associated with a memory address that corresponds to a second virtual processor, the second entry includes the interrupt vector identifier, and the second entry is further associated with the second virtual processor identifier;
- identify the interrupt vector identifier and the second virtual processor identifier included in a message-signaled interrupt; and
- responsive to determining that the second virtual processor identified by the second virtual processor identifier is running, generate a posted interrupt at a logical processor that corresponds to the second virtual processor identifier, wherein the posted interrupt comprises the interrupt vector identifier.

18. The non-transitory machine-readable storage medium of claim 17, wherein the interrupt injection table is in an interrupt injection unit, and wherein the I/O device communicates with the interrupt injection unit via a peripheral interface bus.

19. The non-transitory machine-readable storage medium of claim 17, wherein the I/O device comprises a Peripheral Component Interconnect (PCI) card.

20. The non-transitory machine-readable storage medium of claim 17, wherein creating the first entry in the interrupt mapping table in the memory of the I/O device causes the I/O device to, responsive to a write of interrupt data to the memory page, generate the message-signaled interrupt.

* * * * *